Feb. 17, 1970     T. I. PROKOPOWICZ     3,496,434

HIGH VOLTAGE CERAMIC CAPACITOR

Filed Nov. 22, 1968

United States Patent Office 3,496,434
Patented Feb. 17, 1970

3,496,434
HIGH VOLTAGE CERAMIC CAPACITOR
Thomas I. Prokopowicz, Adams, Mass., assignor to Sprague Electric Company, North Adams, Mass., a corporation of Massachusetts
Filed Nov. 22, 1968, Ser. No. 778,207
Int. Cl. H01g 1/00
U.S. Cl. 317—258                    3 Claims

ABSTRACT OF THE DISCLOSURE

The electric breakdown strength of a high voltage monolithic ceramic capacitor is improved by the inclusion of frame-shaped series electrode layers between oppositely extended parallel-connected electrode layers in the ceramic stack. The frame-like shape of the layers also permits a greater ceramic-to-ceramic bond in the capacitor in the area not interrupted by a metal surface.

BACKGROUND OF THE INVENTION

This invention relates to a high voltage monolithic ceramic capacitor and its method of manufacture, and more particularly to such a capacitor having increased electric breakdown strength.

Two important considerations in high voltage monolithic ceramic capacitors are size and electric breakdown strength. Although sufficiently small capacitors have been produced, it has been difficult to increase their electric breakdown strength without in turn increasing their size. One type of prior art capacitor of a satisfactory small size is a capacitor having its dielectric layers constructed in a parallel arrangement. While this capacitor has had some degree of success, the art has been constantly on the lookout for some way of increasing its electric breakdown strength.

An object of this invention is to provide a high voltage monolithic ceramic capacitor which has increased electric breakdown strength.

A further object is to provide a method of making such a capacitor.

SUMMARY OF THE INVENTION

The high voltage monolithic ceramic capacitor of this invention combines a series-parallel arrangement of electroded ceramic layers in which frame-shaped series electrodes are interspersed between parallel connected electrodes to thereby increase the electric breakdown strength of the capacitor. The capacitor stack includes electroded layers alternately extending to opposite sides of the stack and frame-shaped series electrodes interspersed between each pair of oppositely extending parallel electrodes. Each frame-shaped electrode is dimensioned to extend beyond the inboard ends of each pair of oppositely extending parallel electrodes. The frame-shaped electrodes enhance the attainment of a truly monolithic stack by permitting greater bonding of ceramic to ceramic in the unelectroded portions both within and without the frame-shaped electrode portion.

DESCRIPTION OF THE PREFERRED EMBODIMENT

Figure 1:
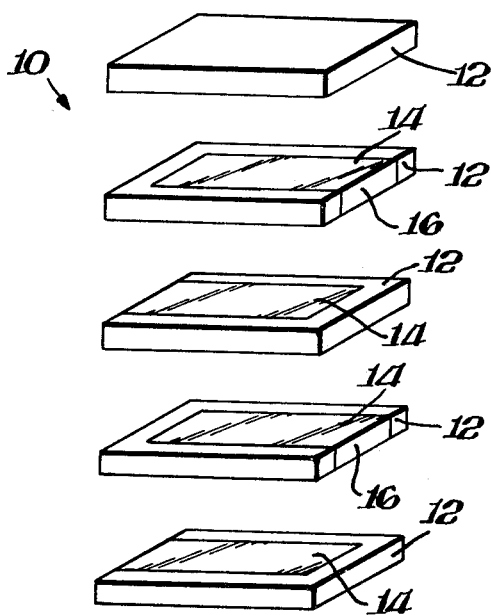
FIGURE 1 is an exploded view of a prior art capacitor.

FIGURE 1 shows an exploded view of a known prior art capacitor in which there is a parallel arrangement of electroded dielectric layers. The procedure involved in forming the finished capacitor 10 includes stacking unfired barium titanate layers 12, some of which are metallized by coatings 14 to form capacitor plates which extend over one edge 16 of layers 12. After the individual layers 12 are alternately disposed to have edges 16 extend from opposite ends of the stack they are sintered at a temperature in the range of 2400° F., to 2700° F. which results in a parallel plate monolithic capacitor 10 in which the layers 12 are bonded together and free of porosity. In the example shown in FIGURE 1 the individual layers 12 are 0.025 inch thick after sintering to form a capacitor 10 having a thickness of 0.125 inch. After the stacked layers are secured together, leads are attached where the electrode plates 16 egress from the stack.

Figure 2:
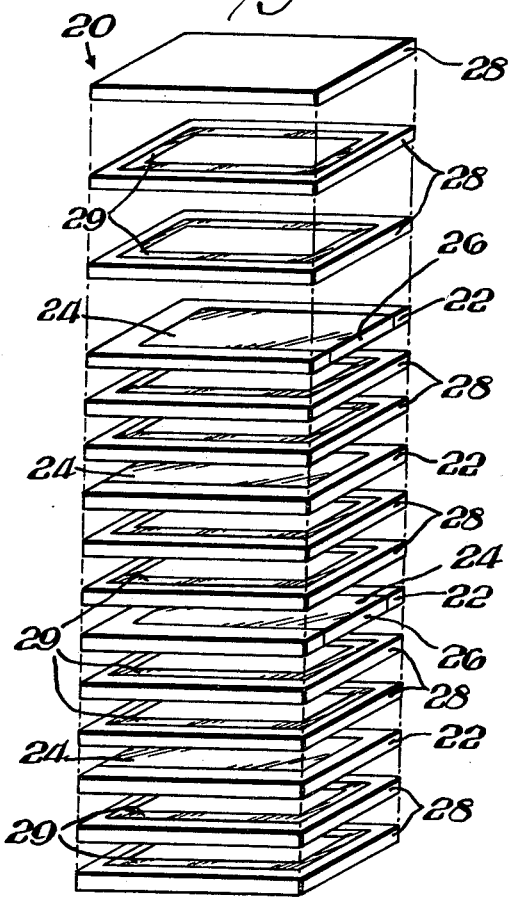
FIGURE 2 is an exploded view of a capacitor formed in accordance with this invention.

FIGURE 2 is an exploded view of a high voltage monolithic ceramic capacitor 20 constructed in accordance with this invention. Capacitor 20 includes ceramic layers 22 which correspond to layers 12 of the prior art. Layers 22 include metallized coatings 24 which extend over one edge 26 of each layer 22. Layers 22, like layers 12 of the prior art, are alternately disposed to have edges 26 extend from opposite ends of capacitor stack 20. Capacitor 20 differs from the prior art capacitor by the inclusion of layers 28 which have frame-shaped metallized coatings 29 deposited on one or both planar surfaces. Frames 29 are floating electrodes which are not in electrical contact with either terminal of capacitor stack 20. Frames 29 act as buried corona rings which maintain the force field lines between oppositely poled adjacent layers 24 perpendicular throughout the capacitive overlap of the adjacent layers 24.

Figure 4:
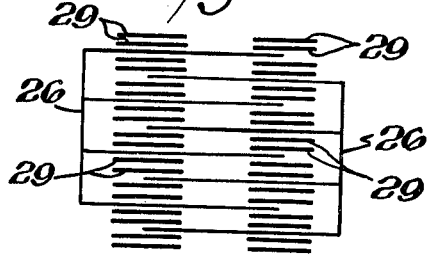
FIGURE 4 is a diagrammatic showing of the electrode arrangement of the capacitor of FIGURE 2.

As best shown in the diagram of FIGURE 4, frames 29 have a perimeter that is greater then the perimeter of the capacitive overlap of adjacent active layers 24. It has been found that the incidence of electrical breakdown is greatest at the ends of active layers 14 in the prior art where the force field lines tend to lose their perpendicularity. The frame-like form of layers 29 achieves the advantage of cost saving in the application of metal, which is particularly important in the case of precious metal that is generally used in high voltage monolithic ceramic capacitors. The frame-like shape of layers 29 also permits the attainment of a better ceramic-to-ceramic bond in a capacitor stack 20 by providing a greater area of direct ceramic contact that is not interrupted by a metal surface.

Although a pair of floating layers 28 is shown between adjacent layers 22, it should be understood that any number of layers can be used depending upon the electrical breakdown that is to be achieved. The extent that each layer 28 is covered by metal frame 29 is not critical so long as the desired overlap of the edge of the adjacent metal layer 24 is achieved. With metal electrodes 26 alternately disposed in parallel electrical connection, and with intervening floating electrode frames 29 disposed in series, capacitor 20 provides a series-parallel arrangement of dielectric layers 22 and 28 which function to reduce electric field strength at the electrode margins where breakdown is usually initiated. The plates 28 at the extremes of the stack may have frame-shaped electrodes in inverted disposition in the stack, or they may be unmetallized ceramic layers.

Figure 3:
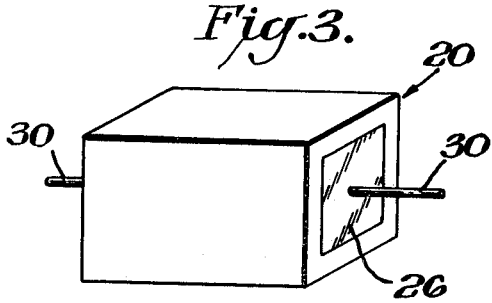
FIGURE 3 is a perspective view of the capacitor of FIGURE 2 in its assembled form.

FIGURE 3 shows capacitor 20 of FIGURE 2 after the capacitor has been sintered together in the range of 2300° F. to 2700° F. in the case of barium titanate. The small total area of metal in frames 29 does not effect the sintering temperature of the ceramic stack from that of the prior art capacitor 10. The sintering temperature is dependent upon the ceramic material employed in layers 22 and 28 and encompasses all of the well known firing ranges for the various commercially employed ceramic compositions. Leads 30 are applied to capacitor 20 in contact with metallic edges 26 of the alternately disposed active electrodes 24.

Series parallel capacitor 20 of this invention provides improved electrical breakdown strength as compared to known prior art parallel capacitor 10 by an order of 25% or more. The improved results of this invention are obtained without any increase in thickness of the capacitor 20. In this respect, because series layers 28 as they become thinner add to the capacitance of the capacitor, it is possible to increase the number of layers while decreasing their thickness so that the total thickness of the novel capacitor as compared with known capacitors of the parallel type is unchanged.

Obviously many modifications and variations of the above invention are possible in light of the above teachings. It is therefore to be understood that within the scope of the appended claims the invention may be practiced otherwise than specifically described.

What is claimed is:

1. A high voltage monolithic ceramic capacitor comprising a plurality of sintered-together ceramic layers, a first set of said layers each having a conductive coating on a planar surface extending to one edge, said first set being alternately disposed in the capacitor to have said conductive edges exposed at opposite ends of the capacitor, a second set of said layers having a frame-shaped conductive coating on a planar surface, at least one layer of said second set of layers interposed between oppositely extended layers of said first set.

2. A capacitor as set forth in claim 1 wherein said frame-shaped coating extends beyond the capacitive overlap of said oppositely extended layers of said first set.

3. A capacitor as set forth in claim 1 wherein said second set of layers is in ceramic bond with said first set of layers around the inner and outer margins of said frame-shaped conductive coating.

References Cited

UNITED STATES PATENTS

| 901,498 | 10/1908 | Thomson | 317—261 |
|---|---|---|---|
| 3,235,939 | 2/1966 | Rodriguez. | |

E. A. GOLDBERG, Primary Examiner

U.S. Cl. X.R.

317—261